United States Patent
Daniels et al.

(10) Patent No.: US 9,488,452 B1
(45) Date of Patent: Nov. 8, 2016

(54) APPARATUS FOR RENDERING AT LEAST A PORTION OF A DEVICE INOPERABLE AND RELATED METHODS

(71) Applicant: Battelle Energy Alliance, LLC, Idaho Falls, ID (US)

(72) Inventors: Michael A. Daniels, Idaho Falls, ID (US); Eric D. Steffler, Idaho Falls, ID (US); Steven D. Hartenstein, Idaho Falls, ID (US); Ronald S. Wallace, Ucon, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 14/693,347

(22) Filed: Apr. 22, 2015

(51) Int. Cl.
| | | |
|---|---|---|
| *F42B 5/18* | (2006.01) | |
| *F23G 5/24* | (2006.01) | |
| *G11B 5/024* | (2006.01) | |
| *G06F 21/88* | (2013.01) | |

(52) U.S. Cl.
CPC ............... *F42B 5/18* (2013.01); *F23G 5/245* (2013.01); *G06F 21/88* (2013.01); *G11B 5/0245* (2013.01)

(58) Field of Classification Search
CPC ................ G11B 5/0245; F23B 7/00–7/005; F42B 39/14; F42B 39/20; B21D 43/003; G23G 5/245; G06F 21/60; G06F 21/6218; G06F 21/88
USPC ........................................ 86/50; 110/235–259
See application file for complete search history.

(56) References Cited

U.S. PATENT DOCUMENTS

| | | | | |
|---|---|---|---|---|
| 3,291,050 A | | 12/1966 | Ahlert et al. | |
| 3,736,878 A | | 6/1973 | Guntermann | |
| 4,633,055 A | * | 12/1986 | Conley | B23K 37/0461 219/121.38 |
| 4,690,012 A | * | 9/1987 | Dahlquist | B25J 17/0283 74/417 |
| 5,086,720 A | * | 2/1992 | Gibran | F23B 7/00 110/234 |
| 5,698,812 A | | 12/1997 | Song | |
| 5,811,055 A | * | 9/1998 | Geiger | B23K 9/0061 266/48 |
| 7,134,375 B2 | * | 11/2006 | Fish, Jr. | F42B 33/062 102/275.12 |
| 7,358,458 B2 | * | 4/2008 | Daniel | B23K 9/0956 219/130.01 |
| 7,600,460 B2 | * | 10/2009 | Manders | F41B 9/0031 102/402 |
| 7,775,146 B1 | * | 8/2010 | Bitar | F41H 11/12 102/403 |
| 7,975,950 B2 | | 7/2011 | Ebadian | |
| 7,985,369 B2 | * | 7/2011 | Crees | B08B 15/00 266/48 |
| 8,251,303 B2 | | 8/2012 | Wozny | |
| 8,332,661 B2 | | 12/2012 | Mostovych | |
| 8,816,717 B2 | | 8/2014 | Fritz et al. | |
| 8,851,404 B2 | | 10/2014 | Clark | |
| 8,860,176 B2 | | 10/2014 | Fritz et al. | |
| 8,861,728 B2 | | 10/2014 | Chu et al. | |
| 2005/0115442 A1 | * | 6/2005 | Rack | F42B 12/44 102/364 |
| 2006/0136958 A1 | | 6/2006 | LeBlanc et al. | |
| 2009/0220088 A1 | | 9/2009 | Lu et al. | |
| 2009/0262623 A1 | | 10/2009 | LeBlanc et al. | |
| 2010/0272921 A1 | * | 10/2010 | Vanden Brande | C23C 14/16 427/561 |
| 2012/0151121 A1 | | 6/2012 | Braga | |
| 2014/0263216 A1 | | 9/2014 | Clark | |

* cited by examiner

*Primary Examiner* — Troy Chambers
*Assistant Examiner* — Joshua Semick
(74) *Attorney, Agent, or Firm* — TraskBritt

(57) ABSTRACT

Apparatus for rendering at least a portion of a device inoperable may include a containment structure having a first compartment that is configured to receive a device therein and a movable member configured to receive a cartridge having reactant material therein. The movable member is configured to be inserted into the first compartment of the containment structure and to ignite the reactant material within the cartridge. Methods of rendering at least a portion of a device inoperable may include disposing the device into the first compartment of the containment structure, inserting the movable member into the first compartment of the containment structure, igniting the reactant material in the cartridge, and expelling molten metal onto the device.

24 Claims, 9 Drawing Sheets

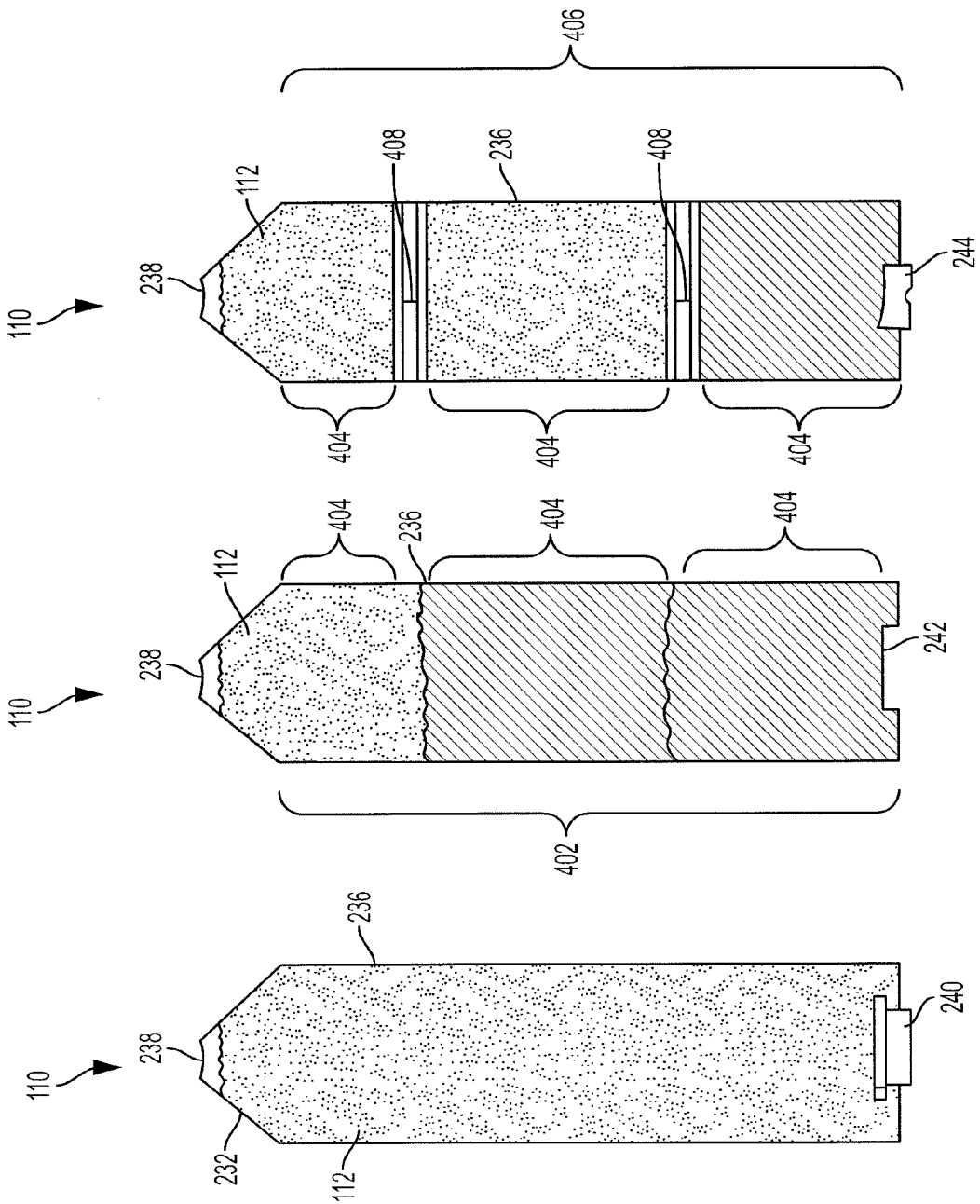

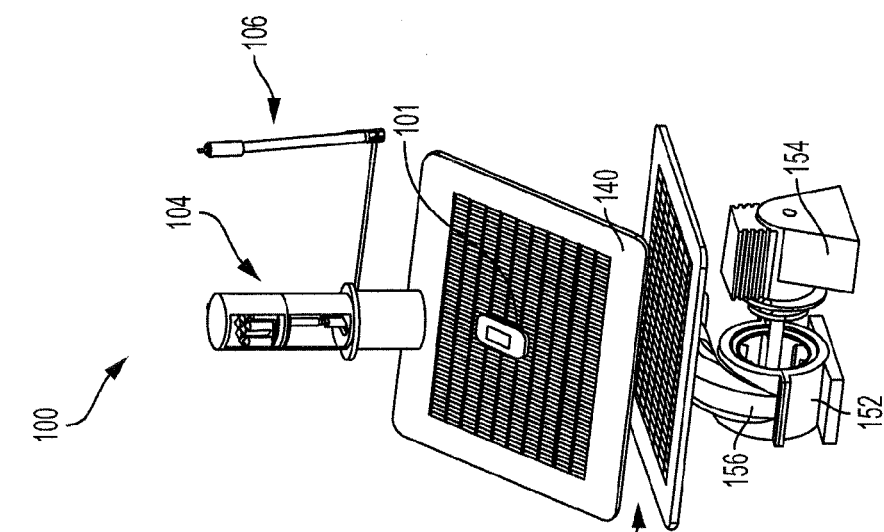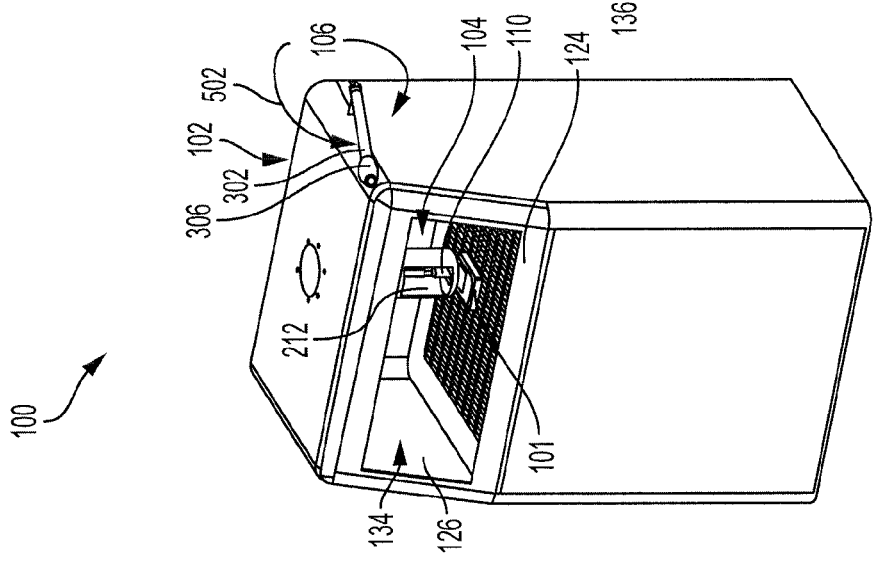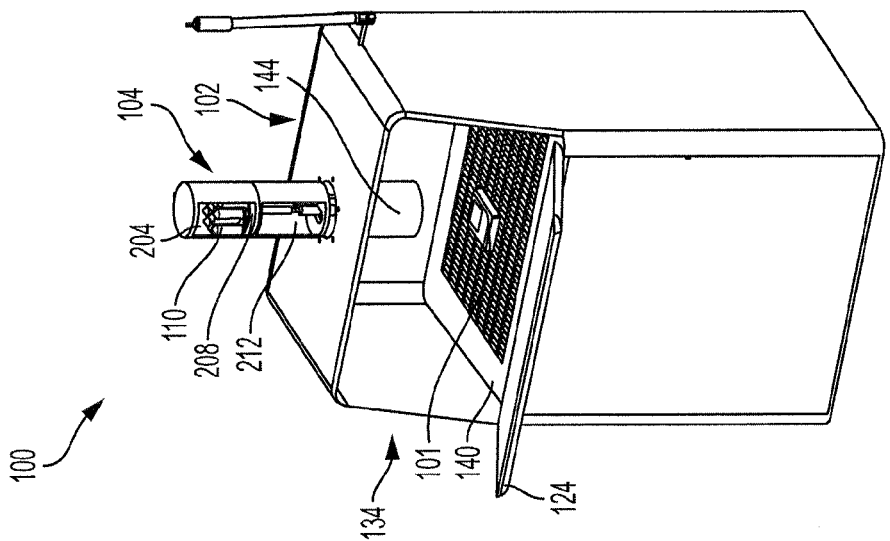

US 9,488,452 B1

APPARATUS FOR RENDERING AT LEAST A PORTION OF A DEVICE INOPERABLE AND RELATED METHODS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

FIELD

Embodiments of the disclosure generally relate to apparatuses and methods for rendering at least a portion of one or more devices inoperable.

BACKGROUND

Electronic devices often have memory portions that can contain data that is confidential or otherwise private. Furthermore, such data often needs to be eliminated or rendered inaccessible for safety or other reasons. Several methods exist for rendering memory portions of electronic devices inoperable. Some methods simply include writing new data over the original data. However, the original data is often recoverable (e.g., accessible) using proper equipment. Other methods include strictly physical means such as the hard-drive shredding device of U.S. Pat. No. 8,851,404 to Clark et al. or the rotatable grind wheel of U.S. Pat. No. 8,251,303 to Wozny. Other methods, as disclosed in U.S. Pat. App. Pub. No. 2014/0263216 A1, include using a mill, laser, or chemical solvent to render the memory portions of electronic devices inoperable. Such methods often require an electrical power source sufficient to power the apparatus physically destroying the memory portion of an electronic device and are nonfunctional in a power outage situation. Furthermore, such methods often leave data on portions of the memory that can still be accessed using proper equipment. Moreover, the machines required are often large and non-mobile.

Other methods include simply crushing the memory device such as the memory destroying device described in U.S. Pat. No. 7,975,950 to Ebadian et al. or degaussing (changing magnetic signatures of the platen of a memory device to random patterns). However, again, such methods can leave portions of the electronic device intact such as, for example, individual plates of a hard drive. Furthermore, simply crushing or degaussing an electronic device may not provide a visual confirmation that the memory portion of the device has been rendered at least substantially inoperable. Yet other methods include melting the entire memory device, and although there is a visual confirmation that all the data has been destroyed and is unrecoverable, the machines required to melt entire memory devices are often large, non-portable, and require a significant power source. Furthermore, the complete process of melting an entire memory device may not be able to be performed quickly without an electrical power source to provide heat.

BRIEF SUMMARY

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

Some embodiments of the present disclosure include an apparatus for rendering at least a portion of a device (e.g., electronic device) inoperable. The apparatus may include a containment structure having a first compartment defined therein that is configured to receive a device therein and a movable member movably coupled to the containment structure. The movable member may be configured to receive at least one cartridge containing a reactant material therein. The movable member may further be configured to move the at least one cartridge to a location proximate the device and to ignite the reactant material within the at least one cartridge.

Some embodiments of the present disclosure include an apparatus comprising a containment structure for receiving a device of which a portion is to be rendered inoperable. The containment structure may include a top wall, a bottom wall, at least one side wall extending between the top wall and the bottom wall, and a guide hole extending through the top wall. The containment structure may further include a first compartment adapted to receive the device and defined within the containment structure proximate the top wall of the containment structure. The apparatus may further include a movable member movably coupled to the top wall of the containment structure, wherein at least a portion of the movable member is insertable through the guide hole into the first compartment of the containment structure.

Some embodiments of the disclosure include methods of rendering at least a portion of a device inoperable. In some embodiments, a method of rendering at least a portion of a device inoperable may include disposing a device in a first compartment of a containment structure, seating a cartridge containing a reactant material comprising a metal in a movable member coupled to the containment structure, inserting the movable member into the first compartment of the containment structure until the cartridge is disposed proximate the device, igniting the reactant material within the cartridge to liquefy the metal, and expelling molten metal onto the device.

BRIEF DESCRIPTION OF THE DRAWINGS

The present disclosure may be understood more fully by reference to the following detailed description of example embodiments, which are illustrated in the accompanying figures, in which:

FIGS. 4A through 4C are cross-sectional views of cartridges containing a reactant material according to embodiments of the present disclosure;

FIGS. 5A through 5C are perspective views of the apparatus of FIG. 1 at different stages of a process of rendering at least a portion of a device inoperable;

DETAILED DESCRIPTION

Figure 1:
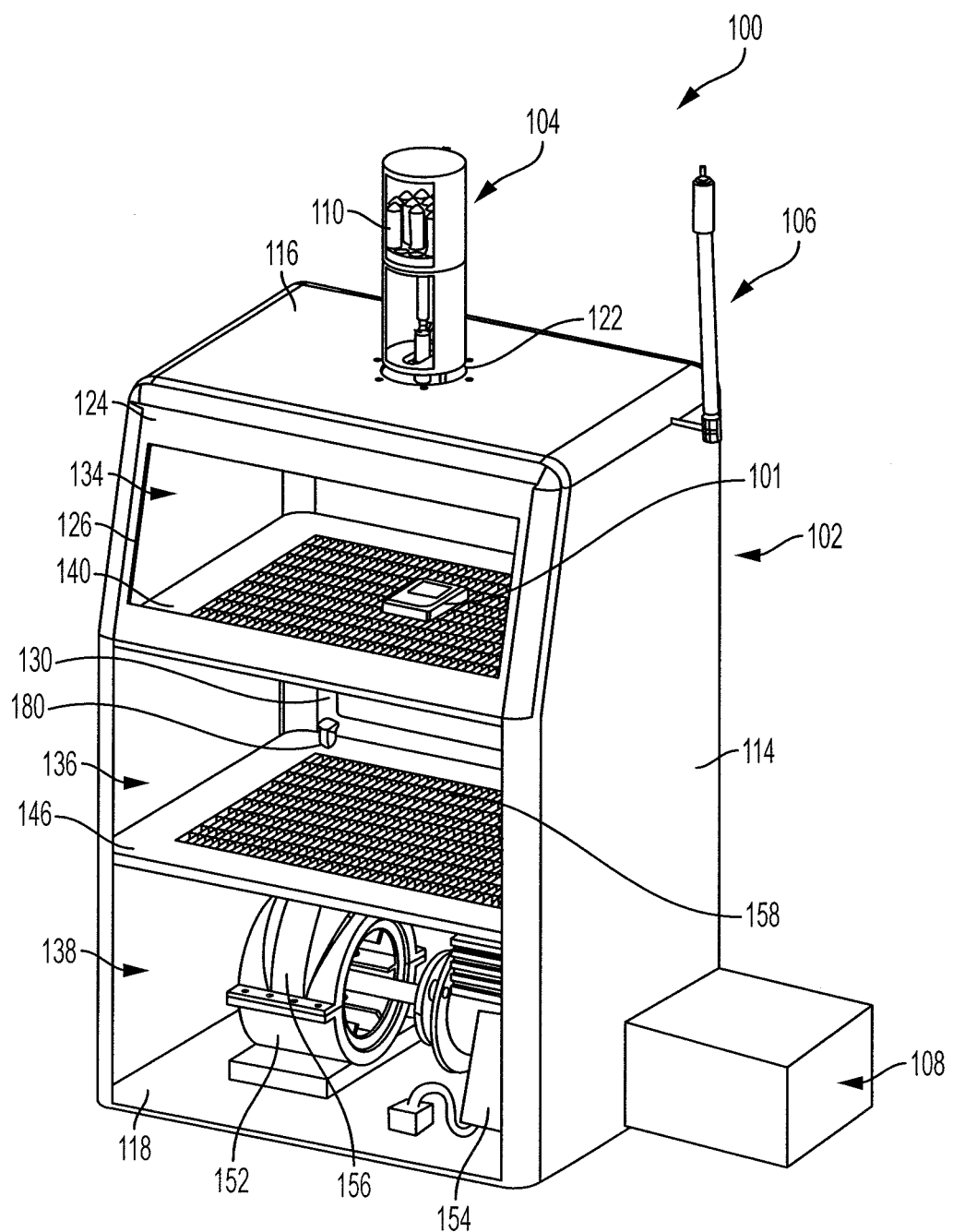
FIG. 1 is a perspective view of an apparatus for rendering at least a portion of a device inoperable according to an embodiment of the present disclosure.

The illustrations presented herein are not meant to be actual views of any particular apparatus for rendering at least a portion of a device unusable, or component thereof, but are merely simplified schematic representations employed to describe illustrative embodiments of the disclosure. The drawings are not necessarily to scale.

Embodiments of the present disclosure may include apparatuses used to render at least a portion (e.g., a majority) of data on a device (e.g., electronic device) unable to be deciphered and/or accessed. Some embodiments of the present disclosure may include apparatuses used to damage or render a device at least partially (e.g., substantially) useless or inoperable, for example, such that it cannot reasonably perform its intended function. Some embodiments of the present disclosure may include apparatuses used to render at least a portion of one or more devices inoperable by melting at least a portion of the device (e.g., forming one or more holes in the device). In some embodiments, the apparatus may melt at least a portion of the device to form one or more depressions, openings, or holes in a device by igniting a reactant material such as a thermite proximate the device and expelling molten metal onto and/or into the device. As used herein the term "melt" may refer to liquefying, brazing, soldering, and/or welding a portion of a device through heat and burning away a portion of the device through heat. Some embodiments of the present disclosure may include apparatuses used to render at least a portion of a device inoperable, for example, such that the portion of the device cannot reasonably operate properly.

As used herein, any relational term, such as "first," "second," "over," "beneath," "top," "bottom," "underlying," "up," "down," etc., is used for clarity and convenience in understanding the disclosure and accompanying drawings, and does not connote or depend on any specific preference, orientation, or order, except where the context clearly indicates otherwise. For example, these terms may refer to an orientation of elements of the apparatus relative to a surface upon which the apparatus may be disposed and operated (e.g., as illustrated in the figures).

As used herein, the terms "vertical" and "horizontal" may refer to a drawing figure as oriented on the drawing sheet, and in no way are limiting of orientation of an apparatus for rendering at least a portion of a device inoperable, or any portion thereof. For example, when referring to elements illustrated in the figures, the terms "vertical" or "horizontal" may refer to the orientation of elements of the apparatus relative to a surface upon which the apparatus may be disposed and operated.

FIG. 1 is a perspective view of an apparatus 100 for rendering at least a portion of a device 101 inoperable according to an embodiment of the present disclosure. As used herein the term "inoperable" may mean that at least a portion of the device 101 at least partially no longer works for its intended purpose. For example, a portion of a device 101 may be rendered inoperable if data stored on that portion of the device 101 is unable to be deciphered or accessed. Furthermore, a portion of a device 101 may be rendered inoperable if that portion of the device 101 is damaged or destroyed. For example, a portion of a device 101 may be destroyed if that portion of the device 101 has been at least substantially ruined structurally by, for example, melting away that portion of the device 101. In another non-limiting example, a portion of a device may be destroyed if a material microstructure of that portion of the device 101 has been changed.

In FIG. 1, a front portion of the apparatus 100 is removed to further illustrate a structure and operation of the apparatus 100. In some embodiments, the apparatus 100 may include a containment structure 102, a movable member 104, and a handle assembly 106. In some embodiments, the apparatus 100 may further include a central control computer 108. The apparatus 100 may also include at least one cartridge 110, which may contain a reactant material 112 (FIGS. 4A through 4C).

The containment structure 102 of the apparatus 100 may include side walls 114, a top wall 116, a bottom wall 118, a guide hole 122, a first compartment 134, a second compartment 136, and a third compartment 138.

In some embodiments, the first compartment 134 of the containment structure 102 may include a first door 124 and a first floor structure 140. The first door 124 may include a window 126 extending therethrough. The second compartment 136 of the containment structure 102 may include a second door 130 and a second floor structure 146. The third compartment 138 may include a fan 152, a first motor 154, and a vent 156.

The side walls 114 of the containment structure 102 may extend between the top wall 116 and the bottom wall 118 of the containment structure 102. The first compartment 134 of the containment structure 102 may be proximate the top wall 116 of the containment structure 102. The third compartment 138 of the containment structure 102 may be proximate the bottom wall 118 of the containment structure 102. The second compartment 136 of the containment structure 102 may be between the first compartment 134 of the containment structure 102 and the third compartment 138 of the containment structure 102.

The window 126 extending through the first door 124 of the first compartment 134 of the containment structure 102 may give a user a view inside of the first compartment 134 of the containment structure 102 when the first door 124 is closed. As shown in FIG. 1, a user may place a device 101 of which at least a portion is to be rendered inoperable in the first compartment 134 of the containment structure 102 of the apparatus 100.

The guide hole 122 may extend through the top wall 116 of the containment structure 102 and into the first compartment 134 of the containment structure 102. The first floor structure 140 of the first compartment 134 of the containment structure 102 may be coupled to one or more side walls 114 of the containment structure 102 proximate a bottom of the first compartment 134 of the containment structure 102 and a top of the second compartment 136 of the containment structure 102. In some embodiments, the first floor structure 140 may be movably coupled to the one or more side walls 114 of the containment structure 102. For example, the first floor structure 140 may be configured to be able to be moved (e.g., swung, rotated, tilted, etc.), such that an object disposed on the first floor structure 140 (e.g., device 101) of the first compartment 134 will travel (e.g., fall) into the second compartment 136 of the containment structure 102 upon movement of the first floor structure 140 of the first compartment 134. Furthermore, in some embodiments, the first floor structure 140 may be movable vertically relative to the containment structure 102 in order to accommodate larger devices 101.

In some embodiments, at least a portion of the first floor structure 140 of the first compartment 134 may include grating 158, which may allow fluids, gases, and particles to move between the first compartment 134 and the second compartment 136 of the containment structure 102.

In some embodiments, the second compartment 136 of the containment structure 102 may not include the second door 130. In other words, the second compartment 136 of the containment structure 102 may not include a respective door providing access to an inside of the second compartment 136. Furthermore, in some embodiments, the second and third compartments 136, 138 of the containment structure 102 may comprise a sealed chamber. In some embodiments, the second and third compartments 136, 138 of the containment structure 102 may be sealable from the first compartment 134 when the first floor structure 140 is in a closed (e.g., not tilted) orientation.

The second floor structure 146 of the second compartment 136 of the containment structure 102 may be secured to the one or more side walls 114 of the containment structure 102 proximate a bottom of the second compartment 136 and a top of the third compartment 138 of the containment structure 102. In some embodiments, the second floor structure 146 may be fixedly secured to the one or more side walls 114 of the containment structure 102 such that the second floor structure 146 does not substantially move. In other embodiments, the second floor structure 146 may be movably coupled to the one or more side walls 114 of the containment structure 102 in a manner similar to the first floor structure 140 of the first compartment 134 of the containment structure 102.

In some embodiments, the second compartment 136 of the containment structure 102 may include a first heat sensitive lock 180 that may prevent the second door 130 of the second compartment 136 from being opened when temperatures within the containment structure 102 are above a certain temperature. In some embodiments, the first compartment 134 may also include a second heat sensitive lock that may prevent the first door 124 from being opened when temperatures within the containment structure 102 are above a certain temperature.

In some embodiments, the second compartment 136 of the containment structure 102 may include a toxicity sensitive lock that may prevent the second door 130 from being opened when, due to gases released when igniting the reactant material 112 in the cartridge 110, a toxicity level within the containment structure 102 is above a safe level. In some embodiments, the second compartment 136 may include a timed lock that may prevent the second door 130 of the second compartment 136 from being opened for a certain amount of time after a cartridge 110 has been ignited.

The fan 152 and first motor 154 may be disposed within the third compartment 138 of the containment structure 102. The vent 156 of the third compartment 138 may extend through the side wall 114 of the containment structure 102. The first motor 154 may be mechanically and operably coupled to the fan 152 such that the fan 152 may be operated by the first motor 154. The fan 152 may be configured to expel gases out of the containment structure 102 through the vent 156. In some embodiments, one or more of the fan 152 and vent 156 may include one or more of a High Efficiency Particulate Air ("HEPA") filter, an activated carbon filter, an ionic filter, and an ultraviolet light air purifier. In some embodiments, the first motor 154 may be powered by a battery power source. In other embodiments, the first motor 154 may be powered by a conventional external power source such as a wall outlet, generator, etc. In some embodiments, the containment structure may include a non-forced air filter.

In some embodiments, the third compartment 138 of the containment structure 102 may include more than one motor, fan, and/or vent. In some embodiments, the first compartment 134 and second compartment 136 of the containment structure 102 may include a respective motor, fan, and/or vent.

In some embodiments, the top wall 116, bottom wall 118, and side walls 114 of the containment structure 102, the first floor structure 140 of the first compartment 134, and second floor structure 146 of the second compartment 136 may comprise a metal and/or metal alloy. For example, in some embodiments, the top wall 116, bottom wall 118, side walls 114, of the containment structure 102, the first floor structure 140 of the first compartment 134, and second floor structure 146 of the second compartment 136 may comprise steel.

As shown in FIG. 1, the movable member 104 of the apparatus 100 may be slidably coupled to the top wall 116 of the containment structure 102 proximate the guide hole 122 of the containment structure 102. As a result, the movable member 104 may be configured to be inserted into the first compartment 134 of the containment structure 102 through the guide hole 122 and may be withdrawn out of the first compartment 134 of the containment structure 102 through the guide hole 122.

The handle assembly 106 of the apparatus 100 may be operably coupled to the movable member 104 such that movement of the handle assembly 106 may insert at least a portion of the movable member 104 into the first compartment 134 of the containment structure 102 and may withdraw the movable member 104 out of the first compartment 134 of the containment structure 102.

In some embodiments, the apparatus 100 may include a cooling system in the second compartment 136 and/or third compartment 138. In some embodiments, the cooling system may be capable of sensing a temperature within a respective compartment. In some embodiments, the apparatus 100 may include a fire extinguishing system in first compartment 134, second compartment 136, and/or third compartment 138. In some embodiments, the fire extinguishing system may be capable of sensing a fire within a respective compartment.

During operation, a user may place a device 101, of which at least a portion is to be rendered inoperable, on the first floor structure 140 in the first compartment 134 of the containment structure 102. The user may then insert the movable member 104 into the first compartment 134 of the containment structure 102 toward the device 101. Once the movable member 104 is at least partially inserted into the first compartment 134 of the containment structure 102, as discussed in further detail below, at least a portion of the device 101 may be rendered inoperable by igniting a cartridge 110 proximate the device 101 and melting a hole in the device 101. The first floor structure 140 of the first compartment 134 of the containment structure 102 may then be moved, and the at least partially inoperable device 101 may be moved into the second compartment 136 of the containment structure 102. The operation and interaction of the containment structure 102, movable member 104, and handle assembly 106 are described in further detail below in regard to FIGS. 5A through 5C.

Figure 2:
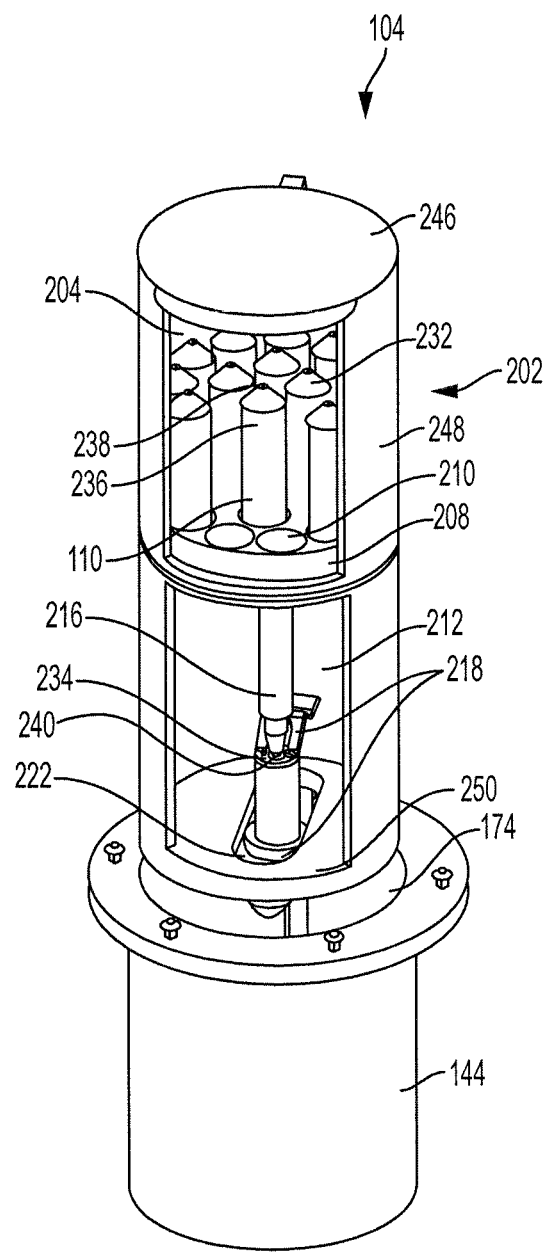
FIG. 2 is a perspective view of a movable member of the apparatus of FIG. 1.

FIG. 2 is a perspective view of the movable member 104 of the apparatus 100 with the containment structure 102 and handle assembly 106 of the apparatus 100 removed to further illustrate the operation and structure of the movable member 104. The movable member 104 may include an outer casing 202, a storage chamber 204, a holding rack 208, a plurality of recesses 210, an ignition chamber 212, an ignition mechanism 216, at least one support structure 218, and an aperture 222. The movable member 104 may further include at least one cartridge 110 (e.g., torch) disposed therein. As shown in FIG. 2, the first compartment 134 (FIG. 1) of the containment structure 102 (FIG. 1) may further include a guide member 144.

The cartridge 110 may include a nozzle end 232, a back end 234, and a body 236 extending between the nozzle end 232 and the back end 234. The nozzle end 232 may include an ejection hole 238. The body 236 of the cartridge 110 may include a reactant material 112 disposed therein (as shown in FIGS. 4A through 4C). In some embodiments, the reactant material 112 may include one or more reactant materials. For example, the reactant material 112 may include one or more of a thermite and a thermate. In some embodiments, the back end 234 of the cartridge 110 may include a fuse 240 for igniting the reactant material 112. In other embodiments, the back end 234 of the cartridge 110 may not include a fuse 240 but may include an access hole 242 (FIG. 4B) exposing at least a portion of the reactant material 112. In other embodiments, the back end 234 of the cartridge 110 may include a primer 244 (FIG. 4C) similar to primers used in ammunition. In operation, when a cartridge 110 is ignited, the cartridge 110 may be configured to expel molten metal out of the ejection hole 238 of the nozzle end 232 of the cartridge 110. The cartridges 110 and the reactant material 112 disposed therein are described in further detail in regard to FIGS. 4A through 4C.

Referring to FIGS. 1 and 2 together, the guide member 144 of the first compartment 134 may be mounted within the first compartment 134 to the top wall 116 of the containment structure 102. The guide member 144 may have an opening 174 extending therethrough. The guide member 144 may be mounted to the top wall 116 of the containment structure 102 such that the guide hole 122 in the top wall 116 of the containment structure 102 is at least substantially aligned with the opening 174 extending through the guide member 144. The movable member 104 of the apparatus 100 may be sized and shaped to be able to moved through the guide hole 122 and opening 174 of the guide member 144 in order to be inserted into and withdrawn from the first compartment 134 of the containment structure 102.

The outer casing 202 of the movable member 104 may include an upper wall 246, an outer side wall 248, and a lower wall 250. The upper wall 246 and lower wall 250 may be oriented at least substantially parallel to each other with the outer side wall 248 extending therebetween. The aperture 222 may extend through the lower wall 250 of the outer casing 202 of the movable member 104 and may be large enough to allow a cartridge 110 to extend therethrough.

The storage chamber 204 may be disposed proximate the upper wall 246 of the outer casing 202, and the ignition chamber 212 may be disposed proximate the lower wall 250 of the outer casing 202. During operation, the storage chamber 204 may be configured to store at least one cartridge 110. For example, the storage chamber 204 may include the holding rack 208 proximate a bottom of the storage chamber 204. In some embodiments, the holding rack 208 may include the plurality of recesses 210, each of which may be configured to hold a cartridge 110.

The ignition chamber 212 may be configured to facilitate igniting a cartridge 110 used to render at least a portion of a device 101 inoperable. For example, the ignition mechanism 216 may be disposed in the ignition chamber 212 such that one end of the ignition mechanism 216 is disposed proximate the aperture 222 in the lower wall 250 of the outer casing 202 of the movable member 104. In embodiments where the cartridge 110 includes a fuse 240 or an access hole 242 (FIG. 4B), the ignition mechanism 216 may be configured to ignite (e.g., create a spark, a flame, heat, an electric charge, etc., or drop a firing pin) the reactant material 112 (FIGS. 4A through 4C) within the body 236 of the cartridge 110. In embodiments where the cartridge 110 includes a primer 244 (FIG. 4C), the ignition mechanism 216 may include a firing pin that can be slammed against the primer 244 (FIG. 4C) to ignite the reactant material 112 within the body 236 of the cartridge 110.

The at least one support structure 218 may be disposed in the ignition chamber 212 of the movable member 104 and may assist in holding a cartridge 110 within the ignition chamber 212 when the cartridge 110 is ignited. For example, in some embodiments, during operation, the at least one support structure 218 may maintain pressure against the back end 234 of a cartridge 110 while the cartridge 110 is ignited and as the cartridge 110 expels molten metal out of the ejection hole 238 of the nozzle end 232 of the cartridge 110.

In operation, a cartridge 110 may be withdrawn from the storage chamber 204 and seated in the ignition chamber 212 such that the cartridge 110 extends though the aperture 222 and the nozzle end 232 is pointed downward toward the first compartment 134 of the containment structure 102. The cartridge 110 may be seated such that the back end 234 of the cartridge 110 is proximate the ignition mechanism 216 of the movable member 104 and such that the at least one support structure 218 of the movable member 104 is applying pressure against the back end 234 of the cartridge 110.

In some embodiments, the movable member 104 may have multiple storage chambers 204. In some embodiments, the movable member 104 may have multiple ignition chambers 212. In some embodiments, the movable member 104 may have multiple ignition mechanisms 216 within a single ignition chamber 212 such that multiple cartridges 110 may be ignited simultaneously or in succession. Some embodiments of the movable member 104 having multiple ignition mechanisms 216 are described in further detail in regard to FIGS. 6A and 6B.

Figure 3:
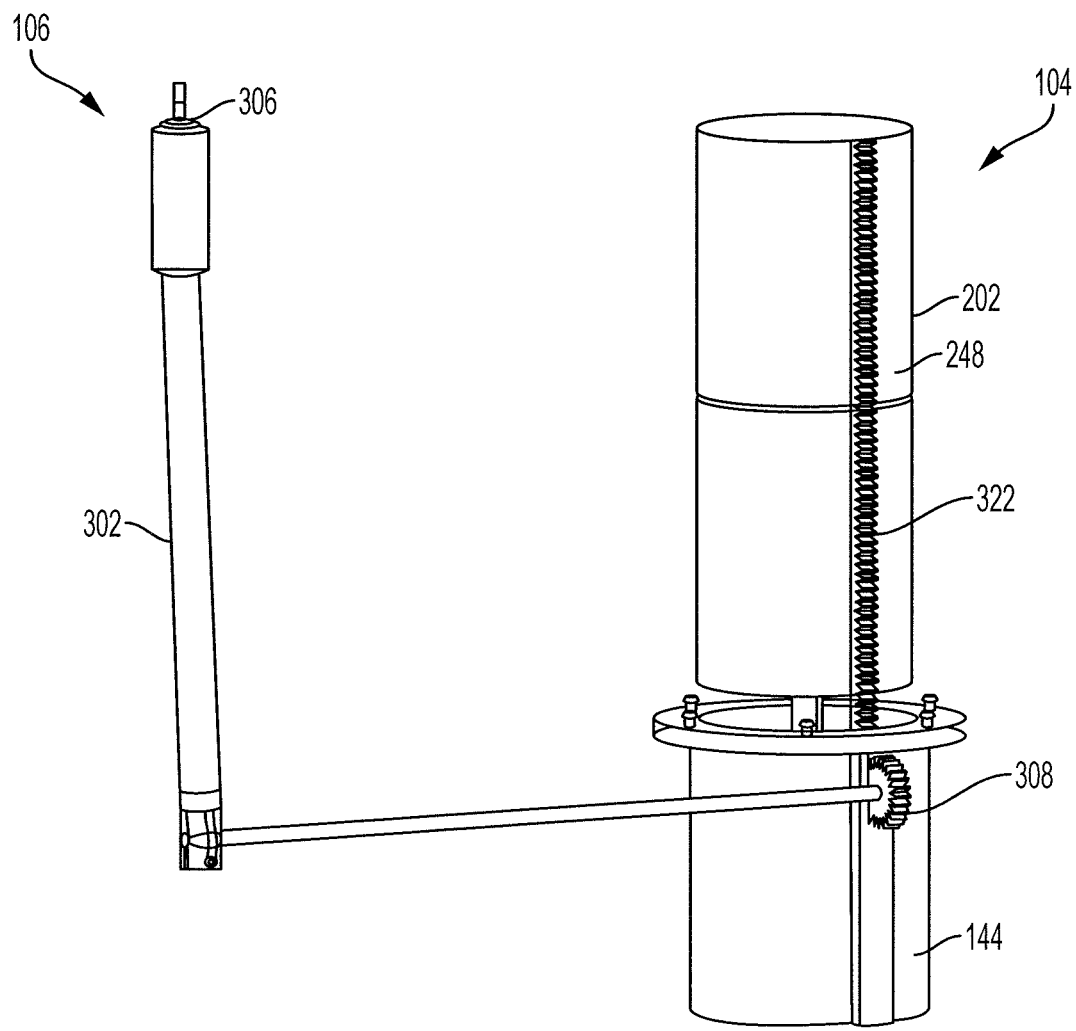
FIG. 3 is a back side view of a handle assembly and movable member of the apparatus of FIG. 1.

FIG. 3 is a back side view of the handle assembly 106 and movable member 104 of the apparatus 100 (FIG. 1) with the containment structure 102 removed to further illustrate the operation and structure of the handle assembly 106 and movable member 104.

The handle assembly 106 may include a handle portion 302, a trigger mechanism 306, and a first coupling member 308. The trigger mechanism 306 may be disposed on a first end of the handle portion 302 of the handle assembly 106. The first coupling member 308 may be disposed on a second end of the handle portion 302 of the handle assembly 106. As shown in FIG. 3, the movable member 104 may include a second coupling member 322 attached to the outer casing 202 of the movable member 104.

The first coupling member 308 of the handle portion 302 of the handle assembly 106 may be operably coupled to the second coupling member 322 of the movable member 104 such that movement of the handle assembly 106 moves the movable member 104. For example, in some embodiments, the first coupling member 308 of the handle portion 302 of the handle assembly 106 may include a pinion gear, and the second coupling member 322 of the movable member 104 may include a pinion rack. In some embodiments, the handle portion 302 of the handle assembly 106 may extend out of the first compartment 134 of the containment structure 102 (FIG. 1) such that the first end of the handle portion 302 and trigger mechanism 306 of the handle assembly 106 are accessible to a user.

Referring to FIGS. 2 and 3 together, the trigger mechanism 306 may cause the ignition mechanism 216 of the movable member 104 to ignite the reactant material 112 (FIGS. 4A through 4C) in a cartridge 110 upon actuation of the trigger mechanism 306. In some embodiments, ignition of the ignition mechanism 216 may be caused by mechanical movement of the trigger mechanism 306 where no power source is required. For example, the trigger mechanism 306 and the ignition mechanism 216 may operate using a piezoelectric effect, as described in further detail in regard to FIG. 5B. In other embodiments, the trigger mechanism 306 may include a power source to facilitate the ignition mechanism 216 igniting the cartridge 110. In some embodiments, the trigger mechanism 306 may comprise a button, switch, trigger, lever, knob, etc. The operation of the handle assembly 106 is described in further detail in regard to FIGS. 5A through 5C.

FIGS. 4A through 4C are cross-sectional views of different cartridges 110 according to some embodiments of the present disclosure. As shown in FIG. 4A, the cartridge 110 may include the reactant material 112 disposed within the body 236 of the cartridge 110. In some embodiments, the reactant material 112 within the body 236 of the cartridge 110 may include one or more reactant materials. For example, the reactant material 112 may include a mixture of a metal powder, a fuel, and a metal oxide. As a non-limiting example, the reactant material 112 may include one or more of a thermite and a thermate. In embodiments including thermite, the thermite may include one or more of an iron, manganese, chromium, silicon, and copper thelinite. In embodiments including thermate, the thermate may include a thermite enriched with a salt-based oxidizer. For example, the thermate may be enriched with one or more of a nitrate and peroxide.

In operation, in some embodiments, when ignited, the reactant material 112 disposed in the cartridge 110 may be configured to react and produce a molten metal. In some embodiments, the cartridge 110 may, when ignited, expel a burst of molten metal through the ejection port of the cartridge 110. Furthermore, in some embodiments, the cartridge 110 may be customizable based on a type of device 101 to be rendered inoperable.

For example, as shown in FIG. 4B, in some embodiments, the reactant material 112 disposed within the cartridge 110 may include a first-type of staged-loading 402. The first-type of staged-loading 402 may include a plurality of different reactant materials stacked in segments 404 next to each other within the body 236 of the cartridge 110. The different reactant material segments 404 may burn at different rates and temperatures and may provide different effects for rendering at least a portion of the device 101 inoperable. In some embodiments, a first segment 404 of the first-type of staged-loading 402 may include a first type of thermite, and a second segment 404 of the first-type of staged-loading 402 may include a second type of thermite. In some embodiments, the first-type of staged-loading 402, when ignited, may expel a single at least substantially continuous burst of a plurality of consecutive different molten metals. In operation, the first-type of staged-loading 402 may be used to at render multiple portions of a device 101 inoperable. For example, the first segment 404 of the first-type of staged-loading 402 may be configured to melt a hole through a casing of a device 101, and the second segment 404 of the first-type of staged-loading 402 may be configured to melt a hole through a memory portion of a device 101. A third segment 404 of the first-type of staged-loading 402 may be configured to spread molten metal throughout any remaining portions of the device 101.

As shown in FIG. 4C, in some embodiments, the reactant material 112 disposed within the cartridge 110 may include a second-type of staged-loading 406. The second-type of staged-loading 406 may include a plurality of segments 404 of reactant materials spaced apart within the body 236 along a longitudinal length of the body 236 of the cartridge 110. Adjacent segments 404 of the plurality of segments 404 of reactant materials may be connected with at least one segment fuse 408. In some embodiments, each segment 404 of the plurality of segments 404 of reactant materials may all include the same reactant material 112. In other embodiments, the reactant material 112 of one or more of the segments 404 of the plurality of segments 404 of reactant materials may differ in comparison to a reactant material 112 of another segment 404 of the plurality of segments 404 of reactant materials. In operation, the second-type of staged-loading 406, when ignited, may expel a plurality of bursts of molten metals in succession.

As a non-limiting example, when ignited, a first segment 404 of reactant material 112 of the second-type of staged-loading 406 may react, produce a first molten metal, expel the first molten metal through the ejection hole 238 of the cartridge 110, and at least substantially render inoperable a first portion of a device 101. After the first segment 404 of reactant material 112 of the second-type of staged-loading 406 has reacted, a first segment fuse 408 may be lit. While the first segment fuse 408 is lit, there may not be any molten metal being expelled from the cartridge 110. During this time, one or more of the cartridge 110 and device 101 may be moved relative to each other. The first segment fuse 408 may then ignite a second segment 404 of reactant material 112, which may react, produce a second molten metal, expel the second molten metal through the ejection hole 238 of the cartridge 110, and at least substantially render inoperable a second portion of the device 101. The cartridge 110 may further include a second segment fuse 408 and third segment 404 of reactant material 112, and the process may repeat itself for each successive segment 404 of reactive material contained in the cartridge 110.

The second-type of staged-loading 406 may be used when multiple different portions of a device 101 need to be rendered at least substantially inoperable without using multiple different cartridges 110. For example, the second-type of staged-loading 406 may be used to render different portions of a laptop at least substantially inoperable, for example, the hard drive, CPU, and RAM in a single, in a multi-stage operation. Operations of the apparatus 100 including movement of the cartridge 110 and/or device 101 are described in further detail with regard to FIGS. 8 and 9.

Referring to FIGS. 4A through 4C together, in operation, when the reactant material 112 disposed in the cartridge 110 is ignited and reacts, the reactant material 112 and resultant molten metal may reach a temperature of at least 660° C. In some embodiments, reactant material 112 and resultant molten metal may reach a temperature of at least 1000° C.

In some embodiments, reactant material 112 and resultant molten metal may reach a temperature of at least 2000° C. In some embodiments, reactant material 112 and resultant molten metal may reach a temperature of at least 2700° C. The operation of the cartridges 110 are described in further detail in regard to FIGS. 5A through 5C.

In some embodiments, the reactant material 112 disposed in the cartridge 110 may include a portion that, when ignited, causes the cartridge 110 to eject out of the ignition chamber 212 of the movable member 104 and into the first compartment 134 of the containment structure 102.

FIGS. 5A through 5C are perspective views of the apparatus 100 of FIG. 1 at different stages of a process of rendering at least a portion of a device 101 inoperable. FIG. 5A is a perspective view of the apparatus 100 at an early stage of the process of rendering at least a portion of the device 101 inoperable. FIG. 5B is a perspective view of the apparatus 100 at an intermediate stage of the process of rendering at least a portion of the device 101 inoperable. FIG. 5C is a perspective view of the apparatus 100 at a later stage of the process of rendering at least a portion of the device 101 inoperable. In FIG. 5C, the top wall 116, bottom wall 118, and the side walls 114 of the containment structure 102 of the apparatus 100 are removed to further illustrate the structure and operation of the apparatus 100. In order to more fully describe the operation and structure of the apparatus 100, a process of rendering at least a portion of a device 101 inoperable using the apparatus 100 is described herein. Although the process of rendering at least a portion of a device 101 inoperable is described herein as including a number of sequential actions, the disclosure is not so limited, and the actions described herein may be performed in different orders.

Referring to FIG. 5A, at a commencement of the process of rendering at least a portion of the device 101 inoperable, a user or automated system may place a device 101 on the first floor structure 140 of the first compartment 134 of the containment structure 102. The user may place the device 101 on the first floor structure 140 of the first compartment 134 of the containment structure 102 such that the device 101 is at least generally aligned with the movable member 104 of the apparatus 100. After placing the device 101 on the first floor structure 140 of the first compartment 134 of the containment structure 102, the user may close the first door 124 of the first compartment 134 of the containment structure 102.

Referring to FIGS. 2 and 5A together, the user or automated system may then load the movable member 104 with a cartridge 110. Loading the movable member 104 may include withdrawing a cartridge 110 from the holding rack 208 of the storage chamber 204 of the movable member 104 and seating the cartridge 110 in the ignition chamber 212 of the movable member 104 such that the cartridge 110 is extending through the aperture 222 with the at least one support structure 218 supporting the cartridge 110. Seating the cartridge 110 in the ignition chamber 212 may further include orienting the cartridge 110 such that the back end 234 of the cartridge 110 is seated proximate the ignition mechanism 216. The cartridge 110 may further be seated in the movable member 104 such that the nozzle end 232 of the cartridge 110 is pointed downwards toward the device 101 disposed in the first compartment 134 of the containment structure 102.

Referring now to FIGS. 3 and 5B together, once the cartridge 110 is properly seated in the ignition chamber 212 of the movable member 104, the movable member 104 may be inserted into the first compartment 134 of the containment structure 102. In some embodiments, the user may insert the movable member 104 by moving the handle assembly 106 in direction 502. Moving the handle assembly 106 in the direction 502 may rotate the first coupling member 308 of the handle assembly 106. Rotating the first coupling member 308 in the direction 502 may cause the second coupling member 322 attached to the movable member 104 to move toward the device 101 disposed in the first compartment 134 of the containment structure 102. Moving the second coupling member 322 toward the device 101 may cause the movable member 104 to move toward the device 101, which may, in turn, cause at least a portion of the movable member 104 to be inserted into the first compartment 134 of the containment structure 102. In some embodiments, the movable member 104 may be inserted into the first compartment 134 of the containment structure 102 by moving the handle assembly 106 in direction 502 until the nozzle end 232 (FIG. 2) of the cartridge 110 seated in the movable member 104 comes into contact with the device 101 of which a portion is to be rendered inoperable. In other embodiments, the movable member 104 may be inserted into the first compartment 134 by moving the handle assembly 106 until the nozzle end 232 (FIG. 2) of the cartridge 110 seated in the movable member 104 is proximate to the device 101 of which a portion is to be rendered inoperable, but not in contact with device 101. Because the movable member 104 is inserted into the first compartment 134 until it comes into contact with or is proximate to the device 101, the apparatus 100 may be capable of accommodating and rendering portions of devices 101 of different sizes and shapes inoperable. For example, the apparatus 100 may be capable of accommodating and rendering portions of many different form factors of hard drives inoperable.

Referring to FIGS. 4A through 4C and 5B together, once the nozzle end 232 of the cartridge 110 is proximate to or in contact with the device 101 to be rendered at least partially inoperable, a user may ignite the reactant material 112 within the seated cartridge 110. In some embodiments, the user or automated system may ignite the reactant material 112, for example, by actuating the trigger mechanism 306 of the handle assembly 106. Actuating the trigger mechanism 306 of the handle assembly 106 may cause the ignition mechanism 216 (FIG. 2) to ignite the reactant material 112 disposed within the cartridge 110. In some embodiments, no external power source is required to cause the ignition mechanism 216 (FIG. 2) to ignite the reactant material 112. For example, a physical action required to actuate the trigger mechanism 306 may cause the ignition mechanism 216 (FIG. 2) to ignite the reactant material 112. In some embodiments, one or more of the trigger mechanism 306 and the ignition mechanism 216 (FIG. 2) may include a piezoelectric effect such that application of a mechanical force generates an electrical charge. In other embodiments, one of the trigger mechanism 306 and ignition mechanism 216 (FIG. 2) may include a power source such as a battery that may be utilized to ignite the cartridge 110.

In embodiments where the back end 234 (FIG. 2) of the cartridge 110 includes a fuse 240 (FIG. 2) or an access hole 242 (FIG. 4B) exposing a portion of the reactant material 112, the ignition mechanism 216 (FIG. 2) may ignite the reactant material 112 of the cartridge 110 by producing a spark or flame. In other embodiments where the back end 234 (FIG. 2) of the cartridge 110 includes a primer 244 (FIG. 4C), actuating the trigger mechanism 306 of the handle assembly 106 may cause a firing pin to contact the primer 244, which may ignite the reactant material 112 of the cartridge 110.

Igniting the reactant material 112 disposed in the cartridge 110 may cause a reaction of the reactant material 112 in the cartridge 110 that melts the metal powder, which is present in the reactant material 112 in the cartridge 110. In some embodiments, the reaction may cause the reactant material 112 to reach a temperature of at least 660° C. In other embodiments, the reaction may cause the reactant material 112 to reach a temperature of at least 1000° C. In other embodiments, the reaction may cause the reactant material 112 to reach a temperature of at least 2000° C. In other embodiments, the reaction may cause the reactant material 112 to reach a temperature of at least 2700° C. Furthermore, the reaction may increase pressure within the body 236 (FIG. 2) of the cartridge 110. The increased pressure within the body 236 (FIG. 2) of the cartridge 110 may cause the resulting molten metal from the reaction to be expelled through the ejection hole 238 (FIG. 2) in the nozzle end 232 (FIG. 2) of the cartridge 110. The expelled molten metal may be expelled onto the device 101 and may melt a hole in at least a portion of the device 101, effectively rendering inoperable at least that portion of the device 101. In some embodiments, the molten metal may be expelled into the device 101 and spread throughout an interior of the device 101, effectively rendering inoperable additional portions of the device 101. For devices 101 that store data on a platen using magnetic particles having specific magnetic signatures, the molten metal may be dispersed onto the platen and may change and/or at least substantially eliminate the magnetic particles and, as a result, the magnetic signatures and data stored on the device 101. In some embodiments, a hole may be melted completely through a device 101 and the device 101 may be rendered undecipherable and/or inaccessible. In other embodiments, a hole may be melted completely through only a portion of a device 101 such as a memory portion. In yet other embodiments, a hole may be melted only partially through a portion of the device 101. In some embodiments, components of the device 101 may participate and/or assist (e.g., react to the molten metal and create additional heat and/or molten material) in rendering at least a portion of the device 101 inoperable.

As a non-limiting example, the apparatus 100 may be used to render at least a portion of a hard drive inoperable, and when the molten metal is expelled from the cartridge 110, the molten metal may melt a hole through a platen used to store data in the hard drive. Melting a hole in the platen of the hard drive at least substantially eliminates any data stored on the platen at the location of the hole. Furthermore, melting a hole in the platen of the hard drive may at least substantially render data that is stored on the platen at locations proximate the hole undecipherable and/or inaccessible. In other words, heat from the molten metal used to melt the hole in the platen may at least substantially render the data stored on the platen around the hole undecipherable and/or inaccessible by changing and/or at least substantially eliminating magnetic signatures that comprise the data. Moreover, gases produced by the reaction of the reactant material 112, upon ignition, and gases produced by melting the hole through the platen may deposit particles of molten metal and other particles on and throughout the platen that may render at least a substantial amount of the data stored on the platen undecipherable and/or accessible. For example, rendering at least a portion of the hard drive inoperable by melting a hole in the hard drive using a cartridge 110, may render the platen, the reading head, the controller electronics, and platen motor of the hard drive at least substantially inoperable. Furthermore, the bearings of the hard drive may be seized by melting a hole in the hard drive using a cartridge 110. In some embodiments, substantially all the data stored in the platen of the hard drive may be at least substantially eliminated and/or rendered undecipherable. Again referring to FIGS. 4A through 4C and 5B together, as the cartridge 110 is expelling the molten metal, a user may look through the window 126 of the first door 124 of the first compartment 134 of the containment structure 102 to observe the cartridge 110 expelling molten metal onto the device 101. As a result, the user may receive a visual confirmation that a hole has been melted in the device 101.

Is some embodiments, subsequent additional cartridges 110 may be seated in the movable member 104, inserted against the device 101, and ignited to melt further holes in the device 101 and further render portions of the device 101 inoperable. The subsequent additional cartridges 110 may be seated, inserted, and ignited in the same manner described above.

Referring now to FIGS. 3 and 5A through 5C together, after portions of the device 101 have been rendered sufficiently inoperable to the satisfaction of a user, the user may move (e.g., tilt) the first floor structure 140 and cause the at least partially inoperable device 101 to travel into the second compartment 136. In some embodiments, spent cartridges 110 (i.e., cartridges 110 that have already been ignited and used to render at least a portion of a device 101 inoperable) may be disposable and may also be moved (e.g., dropped) into the second compartment 136 with the at least partially inoperable device 101. For example, the at least one support structure 218 (FIG. 2) of the movable member 104 may be configured to release a spent cartridge 110 when the first floor structure 140 of the first compartment 134 of the containment structure 102 is moved.

After the at least partially inoperable device 101 has traveled into the second compartment 136 of the containment structure 102, a user may repeat the above procedure and render at least a portion of other devices 101 inoperable, as many times as is needed.

In some embodiments, throughout at least a portion of the above described process, the fan 152 and first motor 154 of the third compartment 138 may be functioning and pushing gases from within the containment structure 102 through the vent 156 and out of the containment structure 102. The fan 152, first motor 154, and vent 156 of the third compartment 138 may be configured to clean the air within the containment structure 102 from potentially hazardous materials produced by igniting the reactant material 112 (FIGS. 4A through 4C) of the cartridges 110 and melting holes in devices 101. For example, the fan 152 of the third compartment 138 may include a HEPA filter and may collect effluent from the reaction of the reactant material 112 (FIGS. 4A through 4C) of the cartridges 110. However, in some embodiments, operating the fan 152 and first motor 154 of the third compartment 138 is not necessary to the procedure. For example, devices 101 may still be rendered at least partially inoperable using the apparatus 100 without operating the fan 152 and first motor 154 of the third compartment 138.

In some embodiments, the fan 152 and first motor 154 of the third compartment 138 and may be configured to create a negative pressure within the containment structure 102 prior to ignition of the cartridge 110. Furthermore, the fan 152 and first motor 154 of the third compartment 138 may be configured to operate upon ignition of the cartridge 110 until the heat sensitive lock 180 (FIG. 1), toxicity sensitive lock, and/or timed lock unlocks the second door 130.

Once a user has finished rendering portions of devices 101 inoperable, the user may remove the at least partially inoperable devices 101 from the second compartment 136 of the containment structure 102 by opening the second door 130 (FIG. 1) of the second compartment 136 and retrieving the at least partially inoperable devices 101. In embodiments that include one or more of the heat sensitive lock 180 (FIG. 1), toxicity sensitive lock, and timed lock, a user may have to wait at least some time before removing the at least partially inoperable devices 101 until the one or more locks allow the second door 130 (FIG. 1) of the second compartment 136 to be opened. In some embodiments, the heat sensitive lock 180, toxicity sensitive lock, or timed lock may require a key to be unlocked. In some embodiments, the second door 130 of the second compartment 136 may require a key to be unlocked.

Figures 6A, 6B:
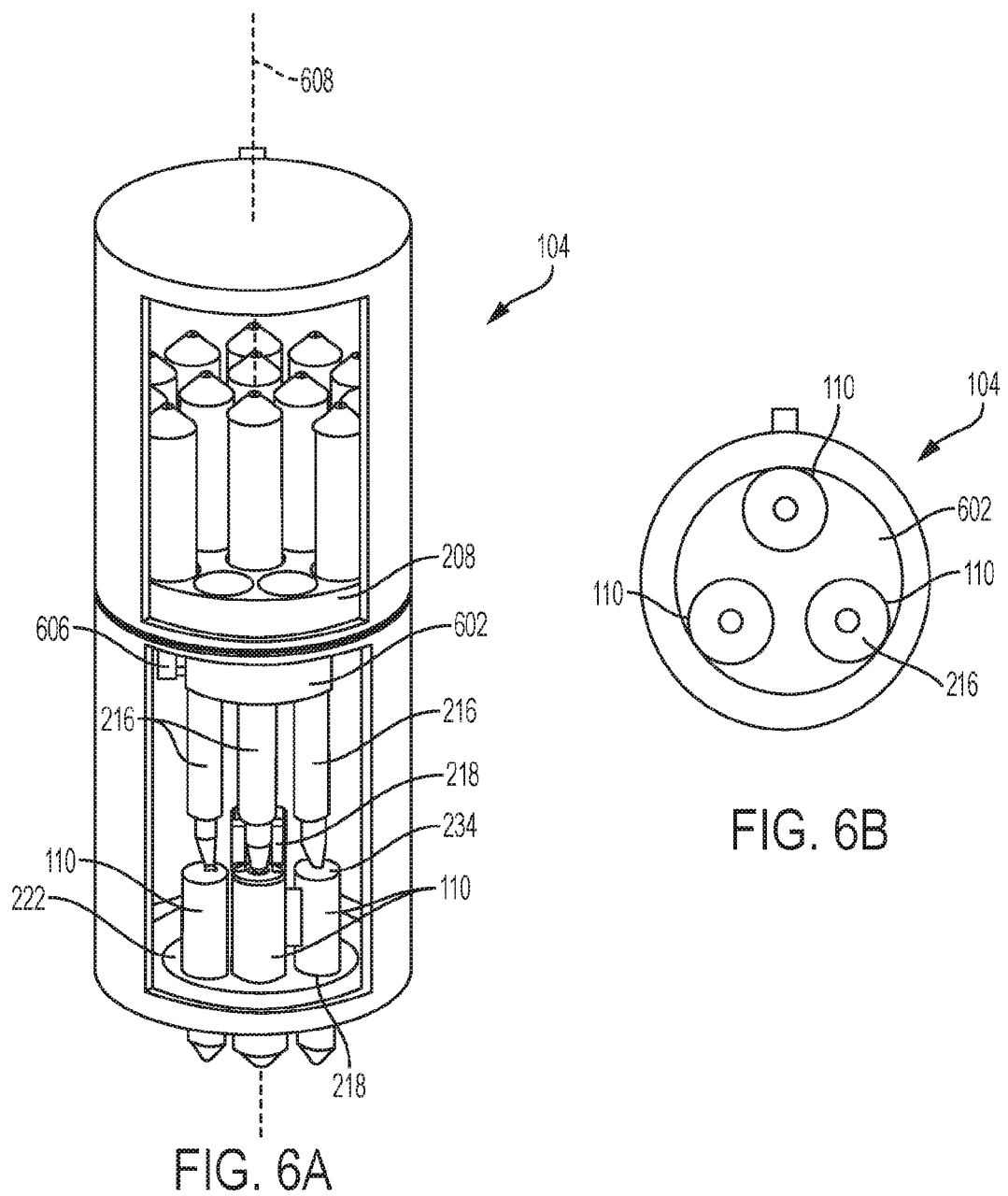
FIG. 6A is a perspective view of a movable member of an apparatus for rendering at least a portion of a device inoperable according to another embodiment of the present disclosure.
FIG. 6B is a bottom side view of a movable member of an apparatus for rendering at least a portion of a device inoperable according to another embodiment of the present disclosure.

FIGS. 6A and 6B are views of a movable member 104 according to another embodiment of the present disclosure. FIG. 6A is a perspective view of a movable member 104 with the containment structure 102 and handle assembly 106 of the apparatus 100 removed to further illustrate the structure and operation of the movable member 104. FIG. 6B is a bottom side view of another movable member 104 with the containment structure 102 and handle assembly 106 of the apparatus 100 removed to further illustrate the structure and operation of the movable member 104.

Referring to FIGS. 6A and 6B together, in some embodiments, the movable member 104 may include a first rotating mechanism 602 and a plurality of ignition mechanisms 216. The first rotating mechanism 602 may be disposed within the ignition chamber 212 of the movable member 104. The plurality of ignition mechanisms 216 may be coupled to the first rotating mechanism 602 and may extend from the first rotating mechanism 602. In some embodiments, the plurality of ignition mechanisms 216 may be oriented next to each other in a linear configuration. As shown in FIG. 6B, in some embodiments, the ignition mechanisms 216 may be oriented next to each other in a circular configuration.

The movable member 104 may be configured to seat a plurality of cartridges 110 simultaneously. In some embodiments, the movable member 104 may include at least one support structure 218 that is configured to support a plurality of cartridges 110. In other embodiments, the movable member 104 may include a plurality of support structures 218, wherein each cartridge 110 of the plurality of cartridges 110 has a respective support structure 218.

Referring to FIGS. 3, 6A, and 6B together, in operation, in some embodiments, upon a single actuation of the trigger mechanism 306 of the handle assembly 106, each cartridge 110 of the plurality of cartridges 110 seated in the movable member 104 may be ignited simultaneously such that multiple holes may be melted in a device 101 simultaneously. In other embodiments, upon a single actuation of the trigger mechanism 306 of the handle assembly 106, only one cartridge 110 of the plurality of cartridges 110 seated in the movable member 104 may be ignited, and subsequent actuations of the trigger mechanism 306 may be necessary to ignite other cartridges 110 of the plurality of cartridges 110 seated in the movable member 104. The plurality of cartridges 110 may include any of the above described reactant materials 112 (FIGS. 4A through 4C), such as, for example, a single reactant material 112 (FIG. 4A), the first-type staged-loading 402 (FIG. 4B), and the second-type staged-loading 406 (FIG. 4C).

In operation, in some embodiments, the first rotating mechanism 602 may be configured to rotate (e.g., spin) the plurality of ignition mechanisms 216 and the plurality of cartridges 110 when the plurality of cartridges 110 are ignited. In some embodiments, the first rotating mechanism 602 may rotate the plurality of ignition mechanisms 216 and the plurality of cartridges 110 about a central axis 608 extending axially through a center of the movable member 104. The first rotating mechanism 602 may rotate the plurality of ignition mechanisms 216 and the plurality of cartridges 110 about the central axis 608 in order to render additional portions of a device 101 (FIG. 1) inoperable. For example, in some embodiments, if the plurality of ignition mechanisms 216 and the plurality of cartridges 110 are rotated by the first rotating mechanism 602 upon ignition of the plurality of cartridges 110, molten metal expelled from the plurality of cartridges 110 may melt a circular-shaped trench in the device 101 (FIG. 1). Melting a circular-shaped trench in the device 101 (FIG. 1) may result in additional portions of the device 101 (FIG. 1) being rendered inoperable in comparison to a portion of a device 101 rendered inoperable by a single hole created by a single cartridge 110. As a result, more data stored on the device 101 (FIG. 1) may be rendered undecipherable and/or inaccessible by melting a circular-shaped trench in the device 101 (FIG. 1).

In some embodiments, the first rotating mechanism 602 may be operated by the handle assembly 106. For example, the first rotating mechanism 602 may be coupled to the handle assembly 106 such that when the handle assembly 106 is moved in a certain direction, the first rotating mechanism 602 is caused to rotate about the central axis 608 of the movable member 104. In other embodiments, the first rotating mechanism 602 may be rotated automatically by a second motor 606 coupled to the first rotating mechanism 602. For example, in some embodiments, the central control computer 108 (FIG. 1) may be in communication with the trigger mechanism 306 of the handle assembly 106, and upon actuation of the trigger mechanism 306 of the handle assembly 106, the central control computer 108 (FIG. 1) may cause the second motor 606 to rotate the first rotating mechanism 602 about the central axis 608 of the movable member 104 as the plurality of cartridges 110 are ignited and expel molten metal onto the device 101 (FIG. 1).

In some embodiments, the movable member 104 may not include the first rotating mechanism 602 but may still include the plurality of ignition mechanisms 216 and the plurality of cartridges 110.

In some embodiments, the movable member 104 may include the first rotating mechanism 602 and may include only a single ignition mechanism 216 and cartridge 110. In such embodiments, the cartridge 110 may be seated in a position offset from a center of the aperture 222 in the lower wall 250 of the outer casing 202 (FIG. 2) of the movable member 104. Furthermore, in operation, in such embodiments, upon actuation of the trigger mechanism 306 of the handle assembly 106, the first rotating mechanism 602 may rotate the single ignition mechanism 216 and cartridge 110 about the central axis 608 of the movable member 104. As a result, the single cartridge 110 may melt a circular-shaped trench in the device 101 (FIG. 1). It is contemplated that the movable member 104 of FIGS. 6A and 6B may be used in conjunction with the containment structure 102 of FIG. 1.

Figure 7B:
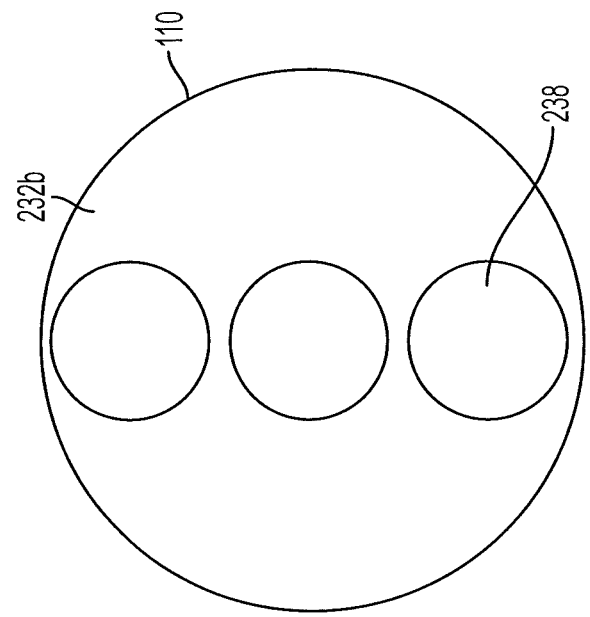
FIGS. 7A and 7B are bottom side views of nozzle ends of cartridges containing a reactant material according to embodiments of the present disclosure.
Figure 7A:
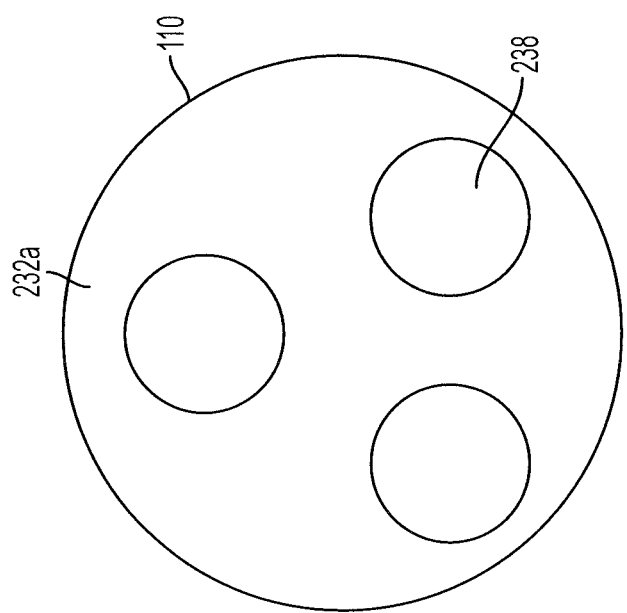

FIGS. 7A and 7B are bottom side views of nozzle ends 232a, 232b of cartridges 110 according to other embodiments of the present disclosure. Referring to FIGS. 7A and 7B together, in some embodiments, the nozzle ends 232a, 232b of the cartridge 110 may include a plurality of ejection holes 238. In some embodiments, the plurality of ejection holes 238 may be oriented next to each other in a linear configuration. In other embodiments, the plurality of ejection holes 238 may be oriented next to each other in a circular configuration. Furthermore, in operation, in some embodiments, the nozzle ends 232a, 232b of the cartridges 110 of FIGS. 7A and 7B may be used in conjunction with the first rotating mechanism 602 of the movable member 104 of FIG. 6A.

Referring to FIGS. 6A, 7A, and 7B together, in such embodiments, the cartridge 110 having a nozzle end 232a, 232b having a plurality of ejection holes 238 may be seated in in the movable member 104 such that the central axis 608 of the movable member 104 extends axially through a center of the cartridge 110. Upon actuation of the trigger mechanism 306 (FIG. 3) of the handle assembly 106 (FIG. 3), the cartridge 110 having a nozzle end 232a, 232b having a plurality of ejection holes 238 may be spun about the central axis 608 of the movable member 104 and may expel molten metal to an area of a device 101 larger than an area of a device 101 to which a cartridge 110 having a single ejection hole 238 expels molten metal. Cartridges 110 having nozzle ends 232a, 232b having a plurality of ejection holes 238 may be used to increase an area of a device 101 (FIG. 1) rendered inoperable using a single cartridge 110.

Figure 8:
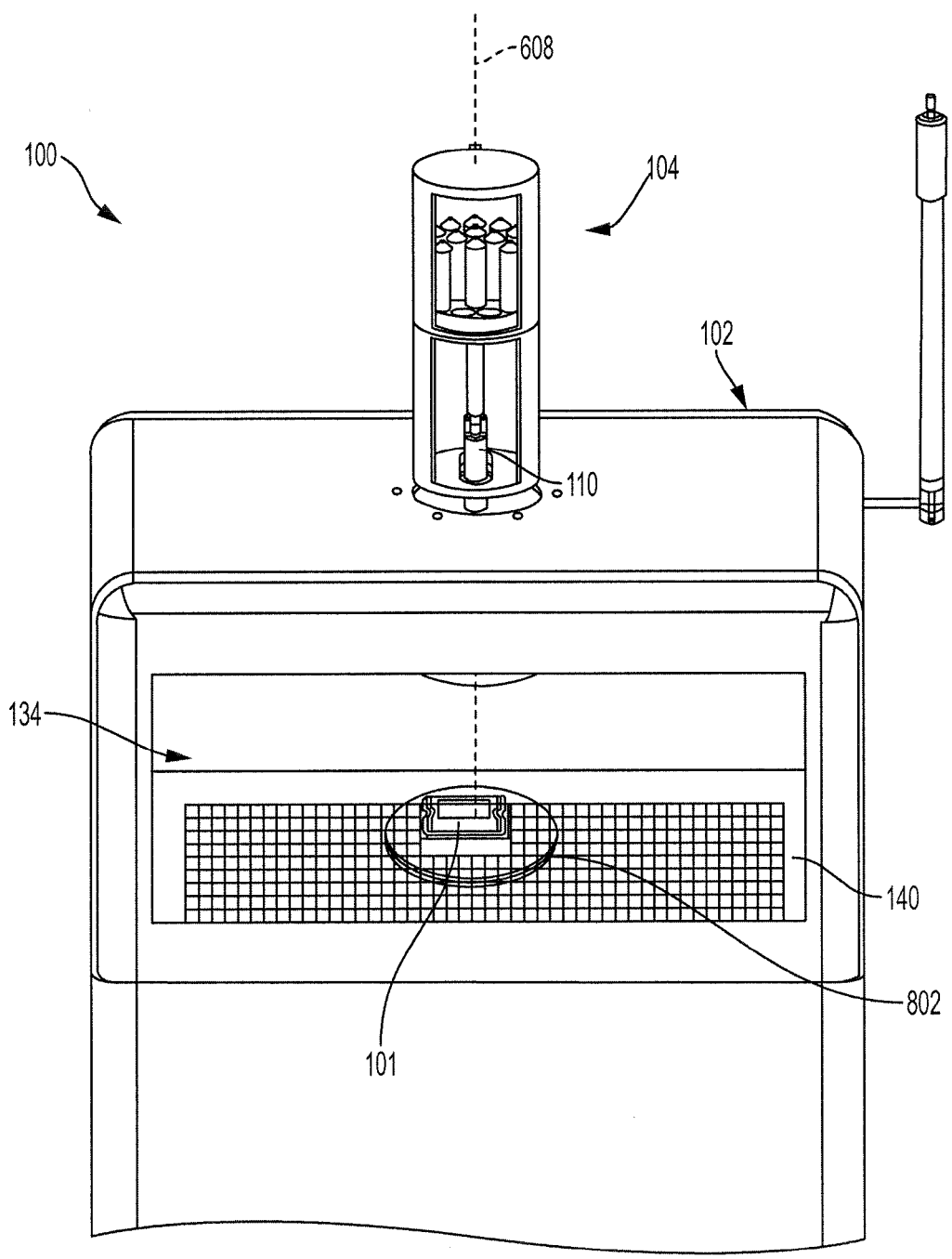
FIG. 8 is a front side view of an apparatus for rendering at least a portion of a device inoperable according to another embodiment of the present disclosure.

FIG. 8 is a front side view of the first compartment 134 of the containment structure 102 of the apparatus 100. In some embodiments, the first floor structure 140 of the first compartment 134 of the containment structure 102 may include a second rotating mechanism 802. The second rotating mechanism 802 may be disposed on the first floor structure 140 of the first compartment 134 of the containment structure 102. In some embodiments, the second rotating mechanism 802 may be permanently attached to the first floor structure 140 of the first compartment 134 of the containment structure 102. In other embodiments, the second rotating mechanism 802 may be removably attached to the first floor structure 140 of the first compartment 134 of the containment structure 102 such that the apparatus 100 may be used with or without the second rotating mechanism 802. The second rotating mechanism 802 may be configured to rotate a device 101 about the central axis 608 of the movable member 104 while a cartridge 110 is ignited proximate the device 101. As a result, the cartridge 110 may melt a circular-shaped trench in the device 101. The second rotating mechanism 802 may be used in conjunction with any of the above described embodiments.

Figure 9:
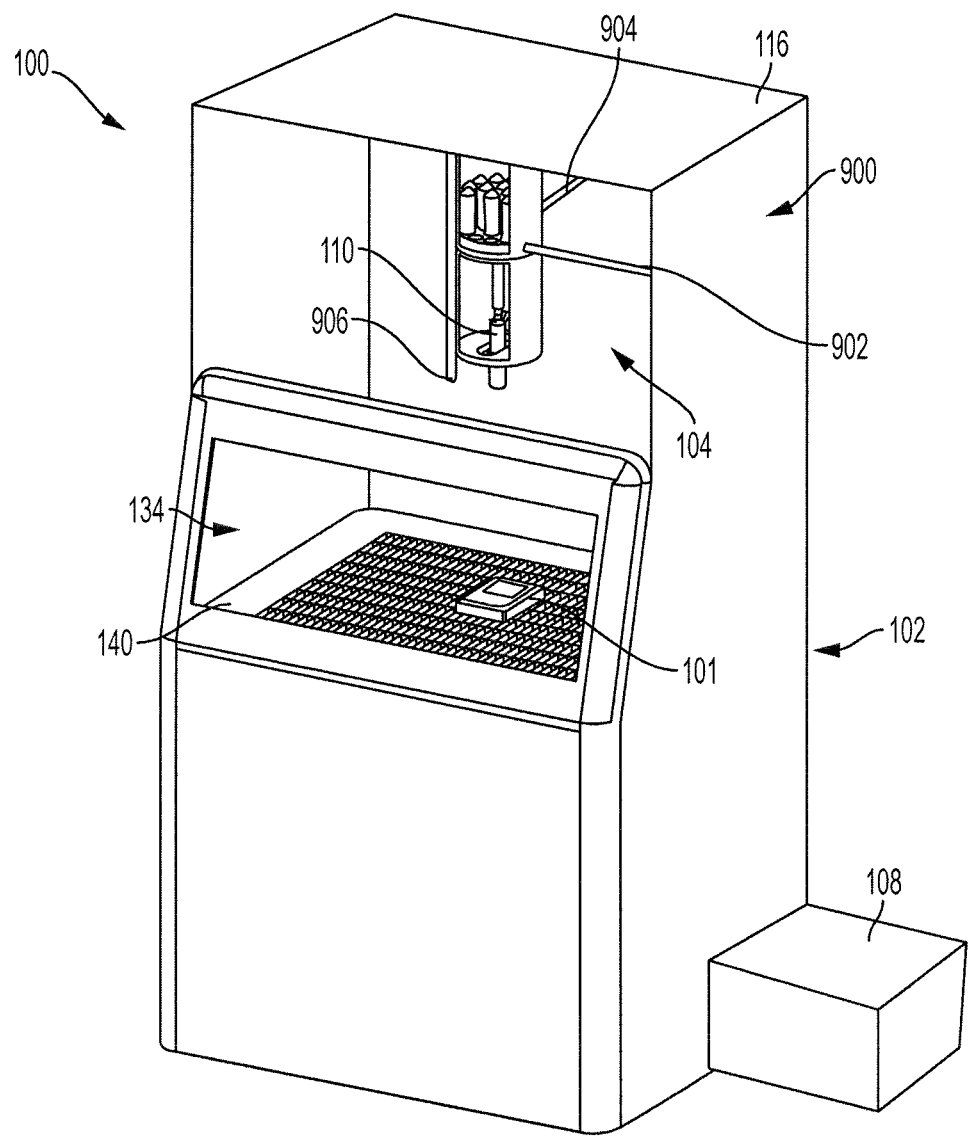
FIG. 9 is a perspective view of an apparatus for rendering at least a portion of a device inoperable according to another embodiment of the present disclosure.

FIG. 9 is a perspective view of an apparatus 100 according to another embodiment of the present disclosure. The apparatus 100 depicted in FIG. 9, may be similar to the apparatus 100 depicted in FIG. 1 except that the apparatus 100 of FIG. 9 may further include a computer numerical control 900 ("CNC"). The CNC 900 may be disposed above the first compartment 134 of the containment structure 102. The CNC 900 may be coupled to the central control computer 108 and may be controlled by the central control computer 108 to move the movable member 104 and cartridge 110 relative to the device 101 in at least two axes of direction. For example, the CNC 900 may include at least one x-axis movable member 902, at least one y-axis movable member 904, and at least one z-axis movable member 906. In embodiments including the CNC 900, the top wall 116 of the containment structure 102 may be disposed above the CNC 900 and the first compartment 134 of the containment structure 102 may not include the guide member 144. In such embodiments, the apparatus 100 may not include the handle assembly 106. Instead, all of the functions and operations performed by the handle assembly 106 in the other embodiments of the apparatus 100 may be performed by the CNC 900.

The at least one x-axis movable member 902, at least one y-axis movable member 904, and at least one z-axis movable member 906 of the CNC 900 may be coupled to the movable member 104 and may be configured to move the movable member 104 in three dimensions.

Is some embodiments, the ignition mechanism 216 (FIG. 2) of the movable member 104 may be controlled and actuated by the central control computer 108. As a result, the cartridges 110 may be ignited responsive to commands by the central control computer 108.

In operation, the central control computer 108 may control movement of the movable member 104 by moving the at least one x-axis movable member 902, at least one y-axis movable member 904, and at least one z-axis movable member 906. As a result, in operation, the central control computer 108 may cause the movable member 104 to be inserted into the first compartment 134 after a device 101 has been placed on the first floor structure 140 of the first compartment 134. In some embodiments, upon ignition of a cartridge 110, the central control computer 108 may cause the movable member 104 to move in at least one direction. For example, the central control computer 108 may cause the movable member 104 to follow a predetermined pattern upon ignition of the cartridge 110. As a non-limiting example, when rendering a laptop computer at least partially inoperable using the apparatus 100, the central control computer 108 may be programmed to move the movable member 104 along a pattern such that the cartridge 110 is moved over the hard drive, CPU, and RAM of the computer. Furthermore, it is contemplated that the movable member 104 of FIGS. 6A and 6B and the cartridges 110 of FIGS. 7A and 7B may be used in conjunction with the CNC 900 of FIG. 9.

Referring again to FIG. 1, it is understood that, although some of the embodiments described above are described as using external electrical power sources and/or batteries, the apparatus 100 is not so limited and may be fully capable of rendering portions of devices 101 inoperable without having any electrical power sources. For example, with embodiments including a trigger mechanism 306 (FIG. 3) and ignition mechanism 216 (FIG. 2) having a piezoelectric effect or a primer 244 (FIG. 4C) and firing pin, the apparatus 100 would be capable of rendering portions of devices 101 inoperable responsive to strictly manual inputs by a user. In other words, functionality of the apparatus 100 that renders portions of devices 101 inoperable will function without electricity. Thus, in the case of an emergency, where electrical power sources are not available, at least a portion of a device 101 having important data thereon could be rendered inoperable quickly and without a power source using the apparatus 100.

Furthermore, as discussed above, in some embodiments, elements (e.g., trigger mechanism 306, ignition mechanism 216, fan 152, first motor 154, etc.) of the apparatus 100 may be powered by a battery. In other embodiments, the apparatus 100 may include an uninterrupted power supply such that when elements of the apparatus 100 depend on electrical power, the elements may be fully functional at least for some time when electrical power sources are not available.

Furthermore, in some embodiments, the apparatus 100 may be portable. For example, in some embodiments, the apparatus 100 may include a plurality of wheels attached to the bottom wall 118 of the containment structure 102. In some embodiments, a weight of the apparatus 100 may be small enough that a user could move the apparatus 100 without the assistance of wheels. Moreover, the containment structure 102, movable member 104, and handle assembly 106 of the apparatus 100 may be configured for easy assembly and disassembly such that the apparatus 100 can be easily disassembled for easier transportation.

In some embodiments, the apparatus 100 may not include the second and third compartments 136, 138 but may include the first compartment 134 with the movable member 104 and handle assembly 106. By not including the second and third compartments 136, 138, portability of the apparatus 100 may be improved, and the apparatus 100 may be smaller and more easily accommodated in smaller areas.

Furthermore, in some embodiments, the apparatus 100 may be relatively small in size (e.g., a size of a desktop computer, briefcase, or flashlight). For example, in some embodiments, the apparatus 100 may comprise a hand-held device.

In some embodiments, the apparatus 100 may include a sighting mechanism for determining a position of the movable member 104 and cartridge 110 relative to the device 101 and for aligning the movable member 104 and cartridge 110 with the device 101. For example, in some embodiments, the sighting mechanism may include one or more of a light-emitting diode (LED) sight or laser sight. In some embodiments, the apparatus 100 may include a video screen, which may overlay a grid pattern over the device 101 and may assist in moving the movable member 104 and cartridge 110 in a pattern over the device 101.

The embodiments of the disclosure described above and illustrated in the accompanying drawings do not limit the scope of the invention, which is encompassed by the scope of the appended claims and their legal equivalents. Any equivalent embodiments are within the scope of this invention. Indeed, various modifications of the disclosure, in addition to those shown and described herein, such as alternative useful combinations of the elements described, will become apparent to those skilled in the art from the description. Such modifications and embodiments also fall within the scope of the appended claims.

What is claimed is:

1. An apparatus for rendering at least a portion of a device inoperable, the apparatus comprising:
    a containment structure comprising a top wall, side walls and a bottom wall, the containment structure having a first compartment proximate the top wall and having a floor structure vertically spaced from the top wall; and
    a movable member coupled to the containment structure and at least partially movable into the first compartment through a guide hole in the top wall, the moveable member configured to receive at least one discrete cartridge to be seated therein;
    at least one discrete cartridge containing a reactant material comprising a metal material seated in the movable member; and
    at least one ignition mechanism carried by the movable member and selectively actuable to ignite the reactant material of the at least one discrete cartridge to liquefy the metal material to be expelled out of the at least one discrete cartridge.

2. The apparatus of claim 1, further comprising:
    a handle operably coupled to the movable member;
    a trigger mechanism attached to the handle and configured to, upon actuation, cause the at least one ignition mechanism to ignite the reactant material within the at least one discrete cartridge.

3. An apparatus for rendering at least a portion of a device inoperable, the apparatus comprising:
    a containment structure having a first compartment configured to receive a device; and
    a movable member coupled to the containment structure and configured to have at least one cartridge containing a reactant material comprising metal seated therein, wherein the movable member is configured to move the at least one cartridge to a location proximate the device and to ignite the reactant material to liquefy the metal and cause molten metal to be expelled out of the cartridge;
    wherein the movable member comprises:
        a storage chamber containing a storage rack for storing cartridges; and
        an ignition chamber having at least one ignition mechanism disposed therein for cartridge ignition.

4. The apparatus of claim 1, wherein the containment structure further comprises:
    a second compartment below the floor structure of the first compartment; and
    wherein the floor structure is selectively movable to allow a device supported on the floor structure to fall from the first compartment to the second compartment.

5. The apparatus of claim 4, wherein the containment structure further comprises:
    a third compartment below the second compartment, the third compartment comprising:
        a vent communicating from an interior of the third compartment to an exterior of the containment structure; and
        a motor driven fan positioned in operable relationship to the vent.

6. The apparatus of claim 1, wherein the movable member further comprises an outer casing defining a cartridge storage chamber and an ignition chamber therein, and wherein the at least one ignition mechanism is disposed in the ignition chamber.

7. The apparatus of claim 6, wherein the at least one discrete cartridge comprises a plurality of discrete cartridges and the ignition chamber of the movable member comprises a plurality of ignition mechanisms located and configured to ignite a respective discrete cartridges of the plurality.

8. The apparatus of claim 1, wherein a nozzle end of the at least one discrete cartridge includes a plurality of ejection holes.

9. The apparatus of claim 1, wherein the reactant material within the at least one discrete cartridge comprises a metal powder, fuel, and a metal oxide.

10. The apparatus of claim 1, wherein the reactant material within the at least one discrete cartridge comprises a thermite.

11. The apparatus of claim 1, wherein the movable member of the containment structure is configured to orient the at least one discrete cartridge proximate to a device supported on the floor structure within the first compartment and to ignite the reactant material of the at least one discrete cartridge with the ignition mechanism.

12. A method of rendering at least a portion of a device inoperable, the method comprising:
    disposing a device on a floor structure of a first compartment of a containment structure comprising a top wall, side walls and a bottom wall, the first compartment proximate the top wall and the floor structure vertically spaced from the top wall;
    seating at least one discrete cartridge containing a reactant material comprising a metal material in a movable member coupled to the containment structure and at least partially movable into the first compartment through a guide hole in the top wall;

inserting the movable member at least partially into the first compartment of the containment structure through the guide hole until the at least one discrete cartridge is located proximate the device; and igniting the reactant material in the at least one discrete cartridge to liquefy the metal material with a selectively actuable ignition mechanism carried by the movable member and expel molten metal material onto the device.

13. The method of rendering at least a portion of a device inoperable of claim 12, wherein igniting the reactant material in the at least one discrete cartridge comprises igniting a thermite in the at least one discrete cartridge.

14. The method of rendering at least a portion of a device inoperable of claim 12, wherein disposing a device in a first compartment comprises: disposing the device on the floor structure of the first compartment; and mutually aligning a selected portion of the device and the at least one discrete cartridge seated in the movable member.

15. The method of rendering at least a portion of a device inoperable of claim 12, further comprising moving the floor structure of the first compartment to allow the device to fall into a second compartment of the containment structure below the first compartment.

16. The method of rendering at least a portion of a device inoperable of claim 12, wherein inserting the movable member at least partially into the first compartment of the containment structure further comprises moving a handle assembly that is operably coupled to the movable member.

17. The method of rendering at least a portion of a device inoperable of claim 12, wherein igniting the reactant material in the at least one discrete cartridge further comprises:

actuating a trigger mechanism of a handle assembly that is operably coupled to the movable member to cause the ignition mechanism to produce a spark proximate an end of the at least one discrete cartridge to ignite the reactant material thereof.

18. The method of rendering at least a portion of a device inoperable of claim 12, wherein igniting the reactant material in the at least one discrete cartridge further comprises:

actuating a trigger mechanism of a handle assembly that is operably coupled to the movable member to cause the ignition mechanism to contact a primer disposed in an end of the at least one discrete cartridge with a firing pin.

19. The apparatus of claim 3, further comprising at least one cartridge seated in the movable member.

20. The apparatus of claim 19, wherein the at least one cartridge comprises a nozzle end including a plurality of ejection holes.

21. The apparatus of claim 3, wherein the reactant material within the at least one cartridge comprises a metal powder, a fuel, and a metal oxide.

22. The apparatus of claim 3, wherein the reactant material within the at least one cartridge comprises a thermite.

23. The apparatus of claim 3, wherein the movable member of the containment structure is configured to orient the at least one cartridge proximate to a device supported on a floor structure of the first compartment and to ignite the reactant material of the at least one cartridge with the ignition mechanism.

24. The apparatus of claim 1, wherein the movable member further comprises:

a storage chamber containing a storage rack for storing cartridges; and an ignition chamber having the at least one ignition mechanism disposed therein for cartridge ignition.

* * * * *

UNITED STATES PATENT AND TRADEMARK OFFICE
CERTIFICATE OF CORRECTION

PATENT NO. : 9,488,452 B1  
APPLICATION NO. : 14/693347  
DATED : November 8, 2016  
INVENTOR(S) : Michael A. Daniels et al.

It is certified that error appears in the above-identified patent and that said Letters Patent is hereby corrected as shown below:

In the Specification
- Column 9, Line 41, change "copper thelinite." to --copper thermite.--
- Column 14, Line 11, change "Is some" to --In some--

In the Claims
- Claim 1, Column 19, Line 47, change "the moveable" to --the movable--
- Claim 7, Column 20, Line 40, change "ignite a respective" to --ignite respective--

Signed and Sealed this  
Fourth Day of April, 2017

Michelle K. Lee  
*Director of the United States Patent and Trademark Office*